United States Patent [19]

Ramamurthy et al.

[11] Patent Number: 5,896,426

[45] Date of Patent: *Apr. 20, 1999

[54] PROGRAMMABLE SYNCHRONIZATION CHARACTER

[75] Inventors: Krishnan Ramamurthy, Santa Clara; Marc Miller, Palo Alto, both of Calif.; Rong Pan, Aberdeen, N.J.; Francois Ducaroir, Santa Clara, Calif.

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/596,978

[22] Filed: Feb. 5, 1996

[51] Int. Cl.$^6$ ............................................. H04L 7/00
[52] U.S. Cl. ........................ 375/368; 375/354; 375/377
[58] Field of Search ............................ 375/354, 365, 375/377, 368, 366; 370/514

[56] References Cited

U.S. PATENT DOCUMENTS

| | | | |
|---|---|---|---|
| 4,048,445 | 9/1977 | Ghisler | 310/81 |
| 4,071,887 | 1/1978 | Daly et al. | 395/309 |
| 4,271,513 | 6/1981 | Maejima et al. | 371/22 |
| 4,308,472 | 12/1981 | McLaughlin | 327/18 |
| 4,419,633 | 12/1983 | Phillips | 331/17 |
| 4,486,739 | 12/1984 | Franasek et al. | 340/347 |
| 4,564,933 | 1/1986 | Hirst | 370/249 |
| 4,573,017 | 2/1986 | Levine | 327/114 |
| 4,573,172 | 2/1986 | Grimaldi | 375/368 |
| 4,575,841 | 3/1986 | Fagerstedt et al. | 370/248 |
| 4,575,864 | 3/1986 | Rice, Jr. et al. | 375/368 |
| 4,613,979 | 9/1986 | Kent | 375/357 |
| 4,631,719 | 12/1986 | Huffman et al. | 370/15 |
| 4,675,886 | 6/1987 | Surie | 375/368 |
| 4,748,623 | 5/1988 | Fujimoto | 370/513 |
| 4,751,469 | 6/1988 | Nakagawa et al. | 327/7 |
| 4,806,878 | 2/1989 | Cowley | 331/1 A |
| 4,908,819 | 3/1990 | Casady et al. | 370/15 |
| 4,920,546 | 4/1990 | Iguchi et al. | 375/354 |
| 4,975,916 | 12/1990 | Miracle et al. | 371/47.1 |
| 4,979,185 | 12/1990 | Bryans et al. | 375/20 |
| 4,988,901 | 1/1991 | Kamuro et al. | 327/18 |
| 5,010,559 | 4/1991 | O'Connor et al. | 375/116 |
| 5,025,458 | 6/1991 | Casper et al. | 375/114 |
| 5,028,813 | 7/1991 | Hauck et al. | 327/20 |
| 5,040,195 | 8/1991 | Kosaka et al. | 375/114 |
| 5,043,931 | 8/1991 | Kovach et al. | 364/579 |
| 5,052,026 | 9/1991 | Walley | 375/119 |
| 5,111,451 | 5/1992 | Piasecki et al. | 370/29 |
| 5,126,690 | 6/1992 | Bui et al. | 331/1 A |
| 5,159,279 | 10/1992 | Shenoi et al. | 327/2 |
| 5,180,993 | 1/1993 | Dent | 331/16 |
| 5,251,217 | 10/1993 | Travers et al. | 370/538 |
| 5,265,089 | 11/1993 | Yonehara | 370/15 |
| 5,268,652 | 12/1993 | Lafon | 331/1 A |
| 5,274,668 | 12/1993 | Marschall | 375/10 |
| 5,299,236 | 3/1994 | Pandula | 375/116 |
| 5,327,103 | 7/1994 | Baron et al. | 331/1 A |
| 5,337,306 | 8/1994 | Hall | 370/13 |
| 5,343,461 | 8/1994 | Barton et al. | 370/13 |
| 5,353,250 | 10/1994 | McAdams | 365/189.03 |
| 5,379,409 | 1/1995 | Ishikawa | 395/183.13 |
| 5,398,270 | 3/1995 | Cho et al. | 377/39 |
| 5,448,571 | 9/1995 | Hong et al. | 370/105 |
| 5,473,758 | 12/1995 | Allen et al. | 395/430 |
| 5,481,543 | 1/1996 | Veltman | 370/112 |
| 5,559,854 | 9/1996 | Suzuki | 379/27 |
| 5,577,039 | 11/1996 | Won et al. | 370/12 |

*Primary Examiner*—Stephen Chin
*Assistant Examiner*—Betsy L. Deppe

[57] ABSTRACT

A character programming method (10) whereby a synchronization character (17) can be determined in a determine encoding scheme operation (12) and a determine synchronization character operation (14). The synchronization character (17) can then be programmed into a synch character logic (26) of an integrated circuit (20) or a core (20) thereof. The synch character logic (26) can be programmed through a plurality of program pins (30) on the periphery of the integrated circuit (20) or by more sophisticated means such as by sending the programming from a sending integrated circuit (40) to a receiving integrated circuit (42) through a communications line (44).

6 Claims, 2 Drawing Sheets

1010101010

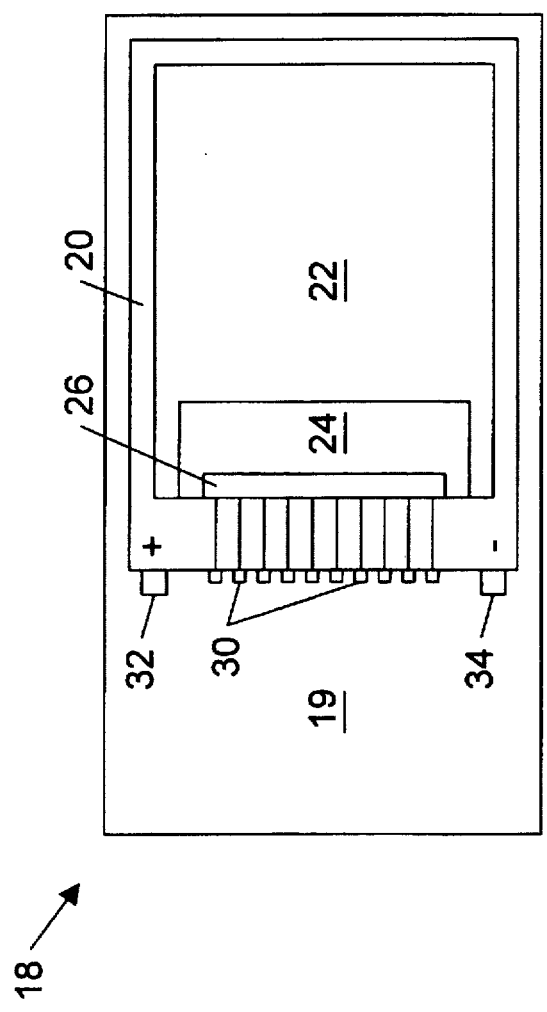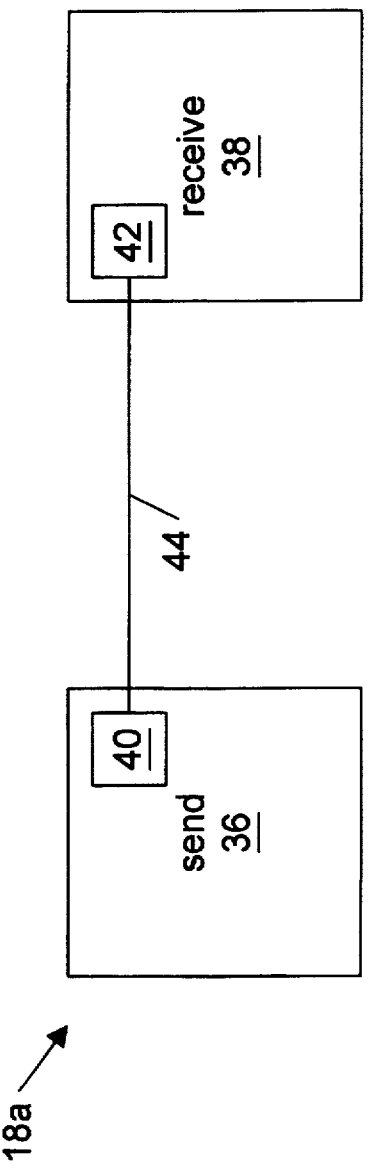
FIG. 3
FIG. 4

PROGRAMMABLE SYNCHRONIZATION CHARACTER

CROSS REFERENCES TO RELATED APPLICATIONS

This application is being filed generally concurrently with the following applications, and these are incorporated herein by reference. U.S. patent application Ser. No. 08/586,173 filed on Jan. 17, 1996 for a WRAP BACK TEST SYSTEM AND METHOD; U.S. Ser. No. 08/596,816 filed on Feb. 5, 1996 for a FAST SYNCHRONIZATION METHOD; U.S. patent application Ser. No. 08/597,896 filed on Feb. 5, 1996 for a HIGH SPEED PHASE LOCKED LOOP TEST METHOD AND MEANS; U.S. patent application Ser. No. 08/586,171 filed on Jan. 17,1996 for a METHOD OF INTERLEAVING NETWORK TRAFFIC OVER SERIAL LINES; and U.S. patent application Ser. No. 08/597,015 filed on Feb. 5, 1996 for a SELF TEST OF CORE WITH UNPREDICTABLE LATENCY.

TECHNICAL FIELD

The present invention relates to the field of electronic data processing and communications, and more particularly to a method and means for synchronizing asynchronous data communications means. The predominant current usage of the present inventive programmable synchronization character will be in synchronization of communications originated and/or terminated by asynchronous data communications integrated circuit devices.

BACKGROUND ART

It is frequently necessary or desirable to insert a synchronization character in a data stream. For example, a Fibre-Channel specification requires the use of such a synchronization character. When a data stream containing a required synchronization character is detected by a FibreChannel compatible device, the device locks onto the data stream and is synchronized therewith.

In order to deserialize a bitstream made up of, for example, a plurality of parallel data streams, it is necessary to initially synchronize the deserializer device with the input stream, so that the deserializer can determine which portion of the serial bitstream corresponds to the first parallel input, which portion to the second input, and the like. Different data formats utilize different synchronization characters, and there are several considerations relevant to the determination of the size and configuration of a synchronization character. Among these considerations are that the synchronization character should be unlike any character that is likely to occur in the regular data stream, and also that DC balance is maintained by keeping a generally equally quantity of ones and zeros, since an excess of either will cause an instantaneous blockage due to inherent capacitance in the transmission means and will, therefore, restrict the speed of transmission at least on copper (as opposed to fiber optic) transmission lines. An excellent discussion of synchronization characters and the relevant considerations is found in U.S. Pat. No. 4,975,916 issued to Miracle et al.

It would be desirable to make data communications devices such that they could communicate with many different types of such devices using a great variety of data formats and data transmission protocols. However, no prior art method has effectively provided for the synchronization of high speed asynchronous serial data in the many various data formats and transmission protocols currently in use and which might be developed in the future.

INDUSTRIAL APPLICABILITY

The inventive character programming method 10 is intended to be widely used in the production and operation of data transmission methods and means, particular in very high speed data communications applications. It is anticipated that there will be significant application by manufacturers, OEM's, equipment installers, and the like—where it will be desirable to have a quantity of parts on hand which might be used in any of a number of different applications, with the user having the flexibility to program the synchronization character 17 at the time the unit is required to be put into operation, installed, or the like. Also, it is anticipated that it will be desirable, in many instances, to go to the extra expense to produce the integrated circuits 20 such that they can be programmed even from a remote location, such as in the example discussed in relation to FIG. 4, herein.

Since the inventive character programming method 10 may be readily practiced in conjunction with a great variety of hardware means and data communication formats and protocols, and particularly since it greatly increases the flexibility and adaptability of such means and methods in relation to the present state of the art, it is anticipated that it will be readily accepted in the industry and included, in one form or another, in many of the data communications products of the future. For these and other reasons, it is expected that the utility and industrial applicability of the invention will be both significant in scope and long lasting in duration.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

DISCLOSURE OF INVENTION

Accordingly, it is an object of the present invention to provide a means for communicating between devices where at least one of such devices is not inherently dedicated to the transmission protocol used by another of such devices.

It is another object of the present invention to provide an improved method for transferring data between computer devices.

It is yet another object of the present invention to provide an improved method and means whereby data communications devices may be more versatile and adaptable than existing such devices.

Briefly, the preferred embodiment of the present invention is a method for making data communications devices more versatile by allowing for the programmability of a synchronization character. Since it is necessary for both a sending device and a receiving device to use the same synchronization character, unless such devices are made to communicate with other of their own kind and no other kind, then such devices could not communicate in the prior art. However, according to the present invention, it is possible to program one or both of the communications devices to adapt such device to send and/or to recognize a particular synchronization character.

In an first preferred embodiment of the invention, a communications device can be programmed through external pins. An equally preferred alternate embodiment of the invention provides for computerized programming through the logic of the invention such that it can be easily reprogrammed or programmed from a remote location An advantage of the present invention is that digital communications devices can be more versatile.

A further advantage of the present invention is that digital communications devices can be premanufactured and/or stockpiled and then programmed for a particular application when needed.

Yet another advantage of the present invention is that an integrated circuit core can be modified to work in a particular application.

Still another advantage of the present invention is that it is easy and inexpensive to implement.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF DRAWINGS

FIG. 3 is a diagrammatic representation of an example of hardware for practicing the present inventive method; and FIG. 4 is an equally preferred alternate embodiment of the hardware of FIG. 3.

BEST MODE FOR CARRYING OUT THE INVENTION

Figures 1, 2:
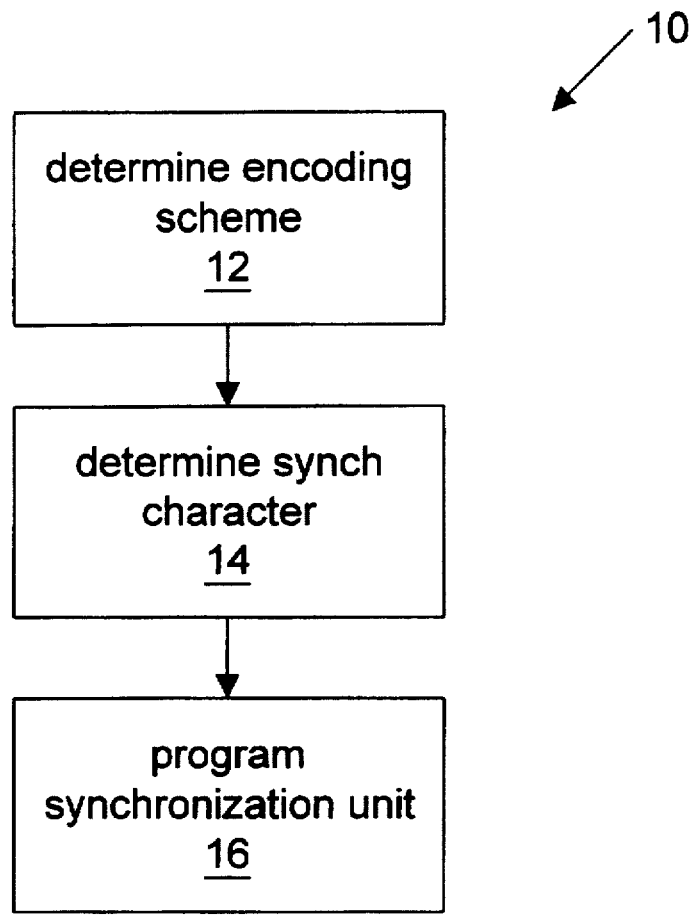
FIG. 1 is a flow chart depicting the basic operations of the present inventive programmable synchronizaton character method.
FIG. 2 is an example of a ten bit synchronization character.

The following detailed description illustrates the invention by way of example, not by way of limitation of the principles of the invention. The best presently known mode for carrying out the invention is a method depicted in the Flow chart of FIG. 1 and designated therein by the general reference character 10. The basic operations of the inventive character programming method 10 are a determine encoding scheme operation 12, a determine synchronization character operation 14 and a program synchronization operation 16. The determine encoding scheme operation 12 and the determine synchronization character operation 14 may be entirely performed by an operator, or may be accomplished by more sophisticated means and methods, as will be discussed in more detail hereinafter. For the present, a simple example of the determine encoding scheme operation 12 would be simply to find out what encoding scheme is being used from available documentation, and an equally simple example of the determine synchronization character operation 14 would be to determine what synchronization character is required, also from the documentation. FIG. 2 depicts a simple example of a ten bit synchronization character 17, consisting simply of alternating ones and zeros, such as might be applied in the practice of the present inventive character programming method 10.

FIG. 3 depicts an exemplary hardware 18 such as might be used in the practice of the present inventive method 10. The exemplary hardware 18 is embodied in a printed circuit board 19, such as a network interface board, or the like, which would generally be inserted in a computer or other data processing or communications means. The printed circuit board has thereon an integrated circuit 20, and a subcomponent of the integrated circuit 20 is a core 22 circuit. Within the core 22 of the example of FIG. 3 is a fast synch unit 24, although it is not intended that the present invention be limited to a particular type of synchronization means as is exemplified by the fast synch unit 24. Whatever type of synchronization means is used, and in particular in the example of the fast synch unit 24 of FIG. 3, there is a synch character logic 26 for holding and maintaining the synchronization character 17 (FIG. 2). In the simple example of FIG. 3, a plurality of program lines 28 connect the synch character logic 26 to a like plurality of program pins 30 on the periphery of the integrated circuit 20. In the present example of FIG. 3 there are ten program pins 30 corresponding to the ten binary digits of the ten bit synchronization character 17. A user or manufacturer can set the synchronization character in the synch character logic 26 by either leaving the program pins unconnected or else connecting the program pins to a supply voltage pin 32 or a ground pin 34 (as is appropriate to the particular configuration of the synch character logic), depending whether a one or a zero is desired at the digit place corresponding to each particular program pin 30.

FIG. 4 depicts an equally preferred alternate embodiment 18a of the exemplary hardware. A sending unit 36 (a sending computer or other such device) is intended to send data to a receiving unit 38. A sending integrated circuit 40 within the sending unit will initiate a serial data stream to a receiving integrated circuit in the receiving unit 38 over a communications line 44. The example of FIG. 4 is intended to illustrate a situation, contemplated by the inventors, wherein it may be necessary or desirable to configure the receiving integrated circuit 42 such that it can readily be programmed to contain essentially any type of synchronization character. Indeed, it might be desirableto have the sending integrated circuit actually program the receiving integrated circuit in preparation for a more elaborate data transmission to follow. One skilled in the art will recognize that, although the examples discussed previously herein of the determine encoding scheme operation 12 and the determine synchronization character operation 14 are extremely simple, it is conceivable that the receiving integrated circuit could actually be provided with intelligence to recognize the type of encoding scheme of incoming data and the type of synchronization character required to synch to such a data stream. This would be an example of a more sophisticated determine encoding scheme operation and determine synchronization character operation 16 touched upon briefly previously herein, and within the contemplation of the inventors as to the practice of the present inventive method 10. Also, as will be recognized by one skilled in the art, when the synch character logic 26 is thus externally programmable, the synch character logic 26 will be a programmable data register.

INDUSTRIAL APPLICABILITY

The inventive character programming method 10 is intended to be widely used in the production and operation of data transmission methods and means, particular in very high speed data communications applications. It is anticipated that there will be significant application by manufacturers, OEM's, equipment installers, and the like— where it will be desirable to have a quantity of parts on hand which might be used in any of a number of different applications, with the user having the flexibility to program the synchronization character 17 at the time the unit is required to be put into operation, installed, or the like. Also, it is anticipated that it will be desirable, in many instances, to go to the extra expense to produce the integrated circuits 20 such that they can be programmed even from a remote locate, such as in the example discussed in relation to FIG. 4, herein.

Since the inventive character programming method 10 may be readily practiced in conjunction with a great variety of hardware means and data communication formats and protocols, and particularly since it greatly increases the flexibility and adaptability of such means and methods in relation to the present state of the art, it is anticipated that it will be readily accepted in the industry and included, in one form or another, in many of the data communications products of the future. For these and other reasons, it is expected that the utility and industrial applicability of the invention will be both significant in scope and long lasting in duration.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claims:

1. A method for programming a receiving integrated circuit, in a transmission system employing a serial link between a transmitting circuit and the receiving integrated circuit, to synchronize on a particular character, the method comprising:

receiving a data stream in the receiving intergrated circuit from the transmitting circuit, the data stream having been encoding according to a particular encoding scheme;

recognizing the particular encoding scheme, the step of recognizing being performed by the integrated circuit, based upon the results of the step of recognizing the particular encoding scheme, determining a synchronization character corresponding to the particular encoding scheme, the step of determining being performed by the receiving integrated circuit;

forwarding a program voltage value corresponding to the synchronization character into a set of external pins to program respective bits within a sync character logic contained within the receiving integrated circuit; and transmitting the synchronization character and a serial data stream across the serial link to the sync character logic.

2. The method of claim 1, wherein:

the sync character logic is set by selectively connecting external pins to an appropriate voltage level.

3. The method of claim 2, wherein:

the appropriate voltage level is a ground potential.

4. The method of claim 2, wherein:

the appropriate voltage level is a positive logic voltage potential.

5. The method of claim 2, wherein:

the program voltage value is forwarded into the external pins across a data communications line.

6.The method of claim 2, wherein:

the program voltage value is forwarded into the external pins from a location remote from the receiving integrated circuit.

* * * * *